United States Patent
von Schönebeck et al.

(10) Patent No.: US 8,958,959 B2
(45) Date of Patent: Feb. 17, 2015

(54) SELF-PROPELLING CONSTRUCTION MACHINE

(71) Applicant: Wirtgen GmbH, Windhagen (DE)

(72) Inventors: Winfried von Schönebeck, Kalenborn (DE); Sascha Schwippert, Königswinter (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 189 days.

(21) Appl. No.: 13/653,105

(22) Filed: Oct. 16, 2012

(65) Prior Publication Data

US 2013/0103273 A1    Apr. 25, 2013

(30) Foreign Application Priority Data

Oct. 19, 2011   (DE) .......................... 10 2011 116 268

(51) Int. Cl.
*G06F 7/00*        (2006.01)
*F01D 15/12*      (2006.01)
(Continued)

(52) U.S. Cl.
CPC .............. *F16H 61/48* (2013.01); *E01C 23/088* (2013.01); *F16H 61/475* (2013.01); *B60Y 2200/25* (2013.01); *B60Y 2200/41* (2013.01); *F16H 2059/467* (2013.01)
USPC ................. 701/51; 415/123; 475/74; 475/78; 475/80; 475/83; 60/607; 123/565

(58) Field of Classification Search
USPC ............. 701/51; 415/123; 475/74, 78, 80, 83; 60/607; 123/565
See application file for complete search history.

(56) References Cited

U.S. PATENT DOCUMENTS 5,473,895 A    12/1995 Bausenhart et al.
6,773,368 B1*  8/2004 Williames ...................... 475/74
(Continued)

FOREIGN PATENT DOCUMENTS

| EP | 0497293 A1 | 8/1992 |
| EP | 0558958 A1 | 9/1993 |
| EP | 0736708 A1 | 10/1996 |

*Primary Examiner* — James Trammell
*Assistant Examiner* — Majdi Alsomiri
(74) *Attorney, Agent, or Firm* — Waddey & Patterson, P.C.; Lucian Wayne Beavers

(57) ABSTRACT

The invention relates to a self-propelling construction machine which has a chassis 1 which has wheels or crawler track units 1A, 1B. The construction machine according to the invention is distinguished by the fact that the gear mechanism system 6 for transmitting the drive power from the drive unit 5, which comprises at least one internal combustion engine 5A, to the working unit 4, which comprises at least one working assembly 4A, does not have a conventional clutch with which the working unit can be activated but instead has a hydrodynamic gear mechanism 10 which has a drive shaft 10A and an output shaft 10B. The construction machine has a control device 16 which is embodied in such a way that the drive power which is transmitted from the drive unit 5 to the wheels of the crawler track units 1A, 1B via the first power transmission line I is controlled in such a way that the rotational speed difference $\Delta = n_1 - n_2$ between the drive shaft and the output shaft of the hydrodynamic transmission of the second power transmission line II corresponds to a predefined value.

15 Claims, 3 Drawing Sheets

(51) Int. Cl.
*B62D 11/06* (2006.01)
*F02B 33/44* (2006.01)
*F02B 33/00* (2006.01)
*F16H 61/48* (2006.01)
*E01C 23/088* (2006.01)
*F16H 61/475* (2010.01)
*F16H 59/46* (2006.01)

(56) References Cited

U.S. PATENT DOCUMENTS

| | | |
|---|---|---|
| 6,785,598 B2 * | 8/2004 | Schiele ............ 701/51 |
| 6,850,829 B2 * | 2/2005 | Eich et al. ............ 701/67 |
| 2012/0201657 A1 * | 8/2012 | Donnelly et al. ............ 415/123 |
| 2012/0266595 A1 * | 10/2012 | Buschur et al. ............ 60/607 |

* cited by examiner

SELF-PROPELLING CONSTRUCTION MACHINE

BACKGROUND OF THE INVENTION

1. Field of the Invention

The invention relates to a self-propelling construction machine which has a chassis which has wheels or crawler track units.

2. Description of the Prior Art

In road construction, self-propelling construction machines of different designs are used. These machines include the known road milling machines, recyclers or stabilisers. The known road milling machines can be used to remove existing layers of road from the superstructure of the road and to restore existing road coverings with the known recyclers. The known stabilisers serve to prepare the substructure for the construction of the road. Furthermore, so-called surface miners are known as self-propelling construction machines for, for example, removing coal or stone.

The above-mentioned self-propelling construction machines have a rotating milling or cutting roller with which the material is removed.

The drive of the milling roller or cutting roller requires a relatively high motor power. If the milling roller or cutting roller comes up against particularly hard material, the power which is necessary to drive the roller can become so large that the drive motor is overloaded. In addition to the overloading of the drive motor, the problem arises that when the milling roller or cutting roller comes up against particularly hard material, the drive elements and the structure of the construction machine are overloaded by shock loading. This problem occurs, in particular, in a surface miner.

The drive motor in the known self-propelling construction machines is an internal combustion engine, in particular a diesel engine, whose engine characteristic is described by a characteristic torque/rotational speed characteristic curve. The internal combustion engine is operated with a specific rotational speed, wherein there is the risk of the internal combustion engine stalling in the case of overloading.

A first power transmission line is used to transmit the drive power from the internal combustion engine to the wheels or crawler track units, while a second power transmission line is used to transmit the drive power from the internal combustion engine to the milling roller or cutting roller. The two power transmission lines each have gear mechanism systems.

Self-propelling construction machines are known in which the gear mechanism system of the power transmission line for transmitting the drive power to the wheels has an adjustable hydrostatic gear mechanism. In order to prevent overloading of the internal combustion engine, a control device for controlling the limit load is provided for the adjustable hydrostatic gear mechanism.

EP 0 497 293 A1 describes a method for controlling the limit load of a hydrostatic drive for a construction machine. The hydrostatic drive comprises a hydraulic pump which is driven by an internal combustion engine, has an adjustable delivery volume and drives a hydraulic motor via a connected hydraulic circuit. When there is a risk of overloading of the internal combustion engine, the delivery quantity of the hydraulic pump is reduced. The control is carried out as a function of the actual rotational speed of the internal combustion engine which is measured with a rotational speed sensor on the output shaft of the engine.

Control devices for hydrostatic drives of construction machines are also known, for example, from EP 0 736 708 B1 and EP 0 558 958 B1.

SUMMARY OF THE INVENTION

The invention is based on the object of improving the operation of a self-propelling construction machine in the case of heavy loading.

This object is achieved according to the invention with the features of the independent device claim and of the independent method claim. Advantageous embodiments of the invention are the subject matters of the dependent claims.

The self-propelling construction machine according to the invention is distinguished by the fact that the gear mechanism system for transmitting the drive power from the drive unit, which comprises at least one internal combustion engine, to the working unit, which comprises at least one working assembly, does not have a conventional clutch with which the working unit can be activated but instead has a hydrodynamic gear mechanism which has a drive shaft and an output shaft. The hydrodynamic gear mechanism has the advantage that it operates largely free of wear and damps shocks or impacts.

Hydrodynamic gear mechanisms in motor vehicles and locomotives are generally known to a person skilled in the art. These hydrodynamic gear mechanisms differ from the hydrostatic gear mechanisms in that the transmission of the power occurs at high flow speeds and at a low pressure.

The turboclutches which operate according to the principle of the hydrodynamic transmission of force are distinguished by the fact that there is a rotational speed difference (slip) between the drive shaft and the output shaft. This slip decreases as the rotational speed of the shaft increases given an assumed constant torque, and said slip increases as the torque increases given an assumed constant rotational speed.

In the construction machine according to the invention, the control device is embodied in such a way that the drive power which is transmitted from the drive unit to the wheels or crawler track units via the first power transmission line is controlled in such a way that the rotational speed difference between the drive shaft and the output shaft of the hydrodynamic gear mechanism of the second power transmission line corresponds to a predefined value. This ensures, on the one hand, that the internal combustion engine of the drive unit is not overloaded in the limit load region, and, on the other hand, ensures that the self-propelling construction machine does not experience overloading of the drive elements or of the structure of the construction machine as a result of shock loading.

If the milling roller or cutting roller of the self-propelling construction machine impacts against particularly hard material, the drive power or advancing speed of the construction machine is reduced, with the result that the internal combustion engine is not overloaded. In this context, the hydrodynamic gear mechanism is operated with a constant slip.

For the construction machine according to the invention it is irrelevant how the control of the drive power which is transmitted to the wheels or crawler track units occurs. In one preferred embodiment, in which the first power transmission line has a gear mechanism system which has an adjustable hydrostatic gear mechanism, the adjustable hydrostatic gear mechanism is adjusted in such a way that the rotational speed difference $\Delta=n_1-n_2$ between the drive shaft and the output shaft of the hydrodynamic gear mechanism corresponds to a predefined value. In the case of a drive which comprises, for example, a generator and an electric motor, the drive power can be controlled, for example, with a frequency converter.

One preferred embodiment of the invention provides a device with which various operating states, in particular a first and a second operating state can be predefined. The predefinition can occur manually with an input unit or automatically by a control unit. The device for predefining the two operating states is embodied in such a way that the control device is deactivated in the first operating state and activated in the second operating state. Consequently, the control according to the invention can be activated and respectively deactivated. It is thus possible to provide the operation of the machine with a specific slip in the hydrodynamic gear mechanism of the power transmission line for the drive of the working unit only when there is a threat of overloading of the drive unit.

In the first operating state, in which the control device is deactivated, a conventional limit load control can take place. If the advancing speed of the construction machine is then reduced by a specific absolute value owing to relatively hard stone, it is possible to switch over to the second operating state in which the control device is activated. The switching over can occur automatically if the advancing speed is compared with a predefined limiting value. When the limiting value is undershot, the system is then switched over from the first operating state to the second operating state. Consequently, switching over takes place from a limit load control to a partial load control.

For the control according to the invention it is irrelevant what design the hydrodynamic gear mechanism has. The only decisive factor is that the gear mechanism has a slip which is dependent on the rotational speed or the torque. It is therefore possible to use all hydrodynamic gear mechanisms which are known to a person skilled in the art. In one particularly preferred embodiment of the invention, the hydrodynamic gear mechanism is a turboclutch.

The gear mechanism system of the power transmission line for transmitting the drive power of the drive unit to the wheels or crawler track units preferably has at least one hydraulic pump with an adjustable delivery volume, which hydraulic pump is connected via hydraulic lines to at least one hydraulic motor for driving the wheels or crawler track units. In this embodiment, the delivery volume of the hydraulic pump is adjusted by the control device in such a way that the rotational speed difference between the drive shaft and the output shaft of the hydrodynamic gear mechanism for transmitting the drive power from the drive unit to the working unit corresponds to a predefined value.

For the invention it is not decisive how the adjustable hydrostatic gear mechanism of the drive train for driving the wheels or crawler track units is designed. All that is decisive is that the gear mechanism is adjustable, with the result that the drive power of the construction machine can be changed. In addition to the hydrodynamic gear mechanism, the gear mechanism system of the power transmission line for transmitting the drive power from the drive unit to the working unit can also have further gear mechanisms. This power transmission line preferably also has a traction drive whose drive element is connected to the output shaft of the hydrodynamic gear mechanism and whose output element is connected to the working assembly of the working unit.

The gear mechanism system of the power transmission line for transmitting the drive power from the drive unit to the wheels or crawler track units can also have further gear mechanisms, in particular a pump distributor gear mechanism in order to be able to drive further assemblies of the construction machine, for example lifting columns for vertical adjustment, partial drives for steering or a water pump.

BRIEF DESCRIPTION OF THE DRAWINGS

In the text which follows, an exemplary embodiment of the invention is explained in detail with reference to the drawings, in which.

DETAILED DESCRIPTION

Figure 1:
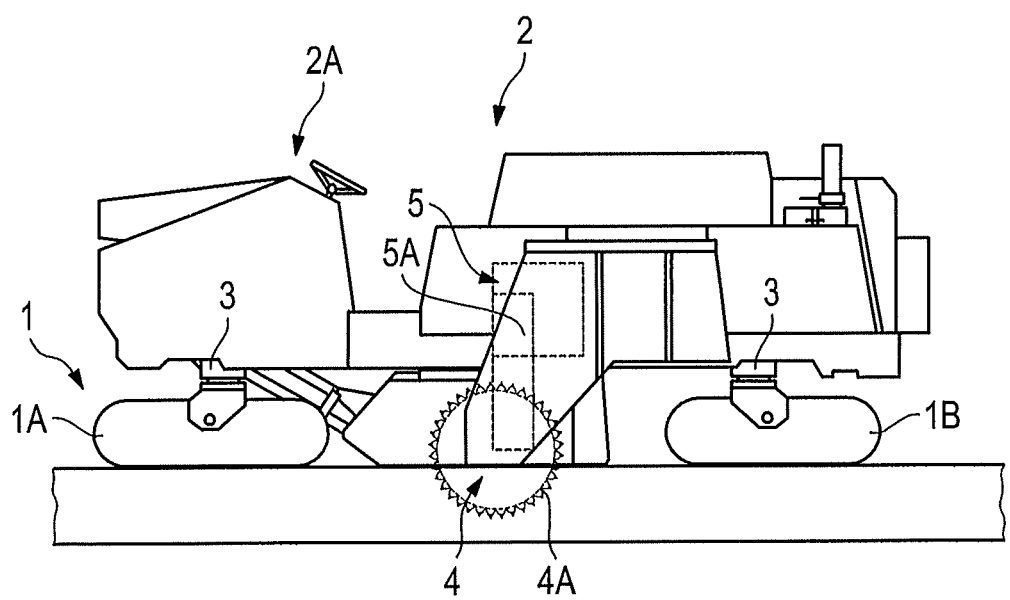
FIG. 1 shows a large miller in a side view as an example of a self-propelling construction machine.

FIG. 1 shows as an example of a self-propelling construction machine a so-called large miller for milling road coverings made of asphalt, concrete or the like. The large miller has a machine frame 2 which is supported by a chassis 1 and has a driver's cab 2A. The chassis 1 of the milling machine comprises, for example, four crawler track units 1A, 1B, which are arranged on the front side and rear side on both sides of the vehicle frame. Instead of crawler track units, wheels may also be provided. The crawler track units 1A, 1B are attached to vertically adjustable lifting columns 3 which are provided on the machine frame 2.

The road milling machine has a working unit 4 which has a working assembly 4A. The working assembly is a milling roller 4A which is equipped with milling cutters. The milling roller 4A is arranged on the machine frame 2 between the front and rear crawler track units 1A, 1B.

For driving the milling roller 4A, the milling machine has a drive unit 5 which has an internal combustion engine 5A. The internal combustion engine 5A not only drives the milling roller 4A but also the crawler track units 1A, 1B and further assemblies of the milling machine.

Figure 2:
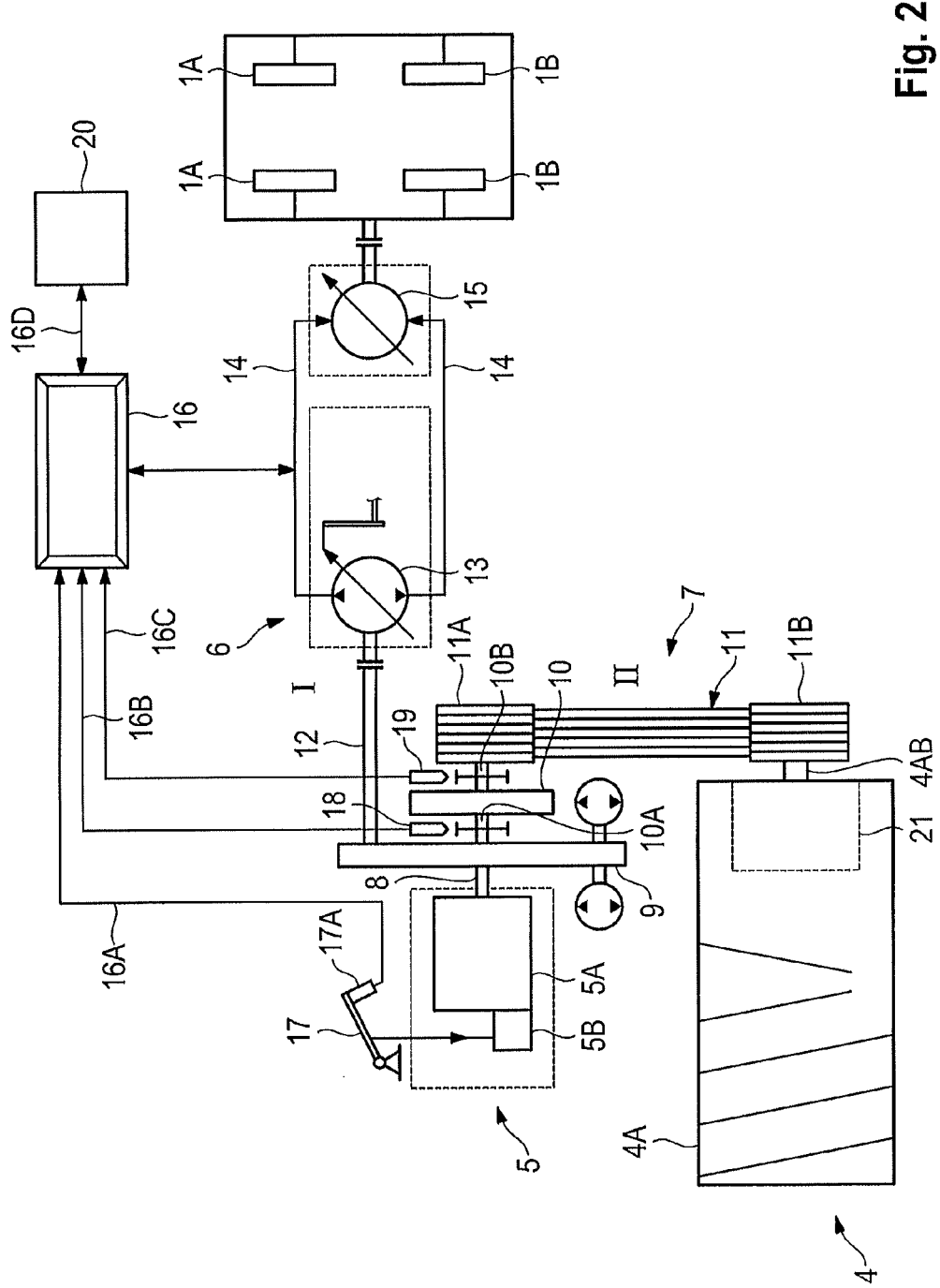
FIG. 2 shows the two power transmission lines for driving the wheels or crawler track units and the working unit of the self-propelling construction machine in a simplified schematic illustration.

FIG. 2 shows the two power transmission lines for transmitting the drive power of the drive unit 5 to the wheels or crawler track units 1A, 1B and the milling roller 4A. In FIG. 2, the wheels or crawler track units are only shown in outline.

The rotational speed of the internal combustion engine 5A can be predefined in a known fashion by the vehicle driver with an accelerator pedal 17. During operation of the construction machine, the vehicle driver uses the accelerator pedal 17 to predefine a rotational speed with which the internal combustion engine can be best operated in terms of economic criteria. However, an actuator lever can also be provided instead of an accelerator pedal 17.

The first power transmission line I is used to transmit a first drive power from the drive unit 5 to the crawler track units 1A, 1B, while the second power transmission line II is used to transmit a second drive power from the drive unit 5 to the milling roller 4. The two power transmission lines I and II each comprise a gear mechanism system 6, 7, which will be described in detail below.

The output shaft 8 of the internal combustion engine 5A is connected via a pump distributor gear mechanism 9 to the drive shaft 10A of a hydrodynamic gear mechanism 10, in particular of a turboclutch. The output shaft 10B of the turboclutch 10 is connected to a drive element 11A of a traction drive 11 whose output element 11B is connected to the drive shaft 4AB of the milling roller 4A. Consequently, the milling roller 4A is mechanically driven by the internal combustion engine 5A via the hydrodynamic gear mechanism 10 and the traction drive 11. A planetary gear mechanism 21 can also be provided between the traction drive 11 and the milling roller 4A.

The locomotive drive in the milling machine is a hydraulic drive. The pump distributor gear mechanism 9 is connected via a shaft 12 to a hydraulic pump 13 whose volume flow can be adjusted as a function of a control signal. The hydraulic pump 13 is in turn connected via hydraulic lines 14 to a hydraulic motor 15 which drives the crawler track units 1A, 1B. Instead of a hydraulic pump and a hydraulic motor, a plurality of hydraulic pumps and/or hydraulic motors which are assigned to the individual crawler track units can also be provided. Such drive systems are known to a person skilled in the art.

The adjustment mechanism for setting the delivery volume of the hydraulic pump 13 is not illustrated in detail. The setting of the delivery volume of the hydraulic pump 13 occurs as a function of a control signal of a control device 16, which may also be referred to as a controller 16. The control device 16 is connected via a line 16A to a sensor 17A which detects the position of the accelerator pedal 17. Furthermore, the control device 16 is connected via a line 16B to a rotational speed sensor 18 which is arranged on the drive shaft 10A of the hydrodynamic gear mechanism 10. The control device 16 is connected via a line 16C to a rotational speed sensor 19 which is arranged on the output shaft 10B of the hydrodynamic gear mechanism 10. The rotational speed sensor 18 measures the rotational speed $n_1$ at the drive shaft 10A, and the rotational speed sensor 19 measures the rotational speed $n_2$ at the output shaft 10B of the hydrodynamic gear mechanism 10. The control device 16 calculates, from the rotational speed $n_1$ and $n_2$, the rotational speed difference $\Delta=n_1-n_2$, which corresponds to the slip of the hydrodynamic gear mechanism 10.

The control device 16 is connected via a line 16D to a device 20 for predefining two operating states. The device 20 may also be referred to as an activation device 20. If the vehicle driver predefines, for example, the first operating state, the control according to the invention, which will be described in detail below, is not active, while the control in the second operating state is active. The vehicle driver will activate the control according to the invention whenever there is a risk of overloading the internal combustion engine.

There is a risk of the internal combustion engine being overloaded or even stalling basically, in particular, when the milling roller comes up against particularly hard material and the wheels or crawler track units of the road milling machine are being driven at full power.

If the control is active, the volume flow of the hydraulic pump 13 is set by the control device 16 in such a way that the rotational speed difference (slip) $\Delta=n_1-n_2$ is equal to a predefined value. This value can be predefined by the vehicle driver. For example, the value can be predefined on an input unit (not illustrated). For example, the value for the slip can be input on a keypad or the like. The input unit can also predefine a selection of various values for the slip, between which values the vehicle driver can select one value. In the simplest case, the input unit may be a switch with a plurality of switched positions, which switch is activated by the vehicle driver in order to select a specific slip. However, it is also possible for a fixed value to be predefined for the slip by the control device, which value cannot be changed by the vehicle driver.

Figure 3:
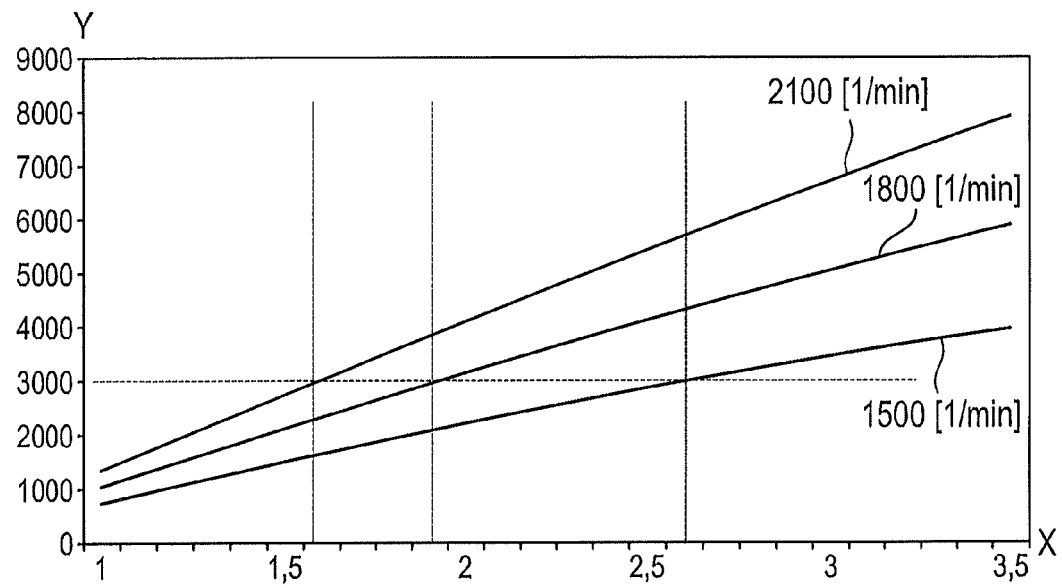
FIG. 3 shows the torque transmitted by the hydrodynamic gear mechanism, as a function of the rotational speed difference between the drive shaft and the output shaft of the hydrodynamic gear mechanism.

FIG. 3 shows the dependence of the torque transmitted by the hydrodynamic gear mechanism 10 on the slip $\Delta=n_1-n_2$ for three different rotational speeds of the internal combustion engine (2100[1/min], 1800 [1/min] and 1500 [1/min]). A rotational speed such as 2100[1/min] may also be referred to as 2100 RPM. The slip [%] is illustrated on the X axis, and the torque [Nm] is illustrated on the Y axis. It is apparent that at a specific rotational speed, predefining a specific slip permits a specific torque to be transmitted by the hydrodynamic gear mechanism. If the internal combustion engine is running, for example, at 2100/min, a torque of 3000 Nm is transmitted when a slip of approximately 1.6% is predefined. If a relatively small rotational speed is selected for the internal combustion engine, for example 1800/min or 1500/min, a relatively small torque, which is approximately 2200 Nm or 1300 Nm, is transmitted given the same slip of approximately 1.6%.

In contrast to a conventional limit load control, the control according to the invention permits the vehicle driver to predefine, by setting a specific slip at a specific rotational speed which the vehicle driver can also select, a specific torque with which the internal combustion engine is operated without the internal combustion engine being overloaded. The vehicle driver can predefine the slip and rotational speed independently of one another in order to be able to operate the construction machine in an optimum way. This will be explained in detail below.

The vehicle driver firstly predefines a specific rotational speed for the internal combustion engine 5A by activating the accelerator pedal 17 or actuator lever. During normal operation of the construction machine, the engine controller 5B of the internal combustion engine 5A keeps the rotational speed predefined by the vehicle driver constant as far as the power of the engine permits.

By predefining a specific rotational speed for the internal combustion engine, the vehicle driver also predefines the cutting speed at which the milling cutters of the milling roller, which is driven by the internal combustion engine, rotate. The vehicle driver can predefine the rotational speed of the internal combustion engine as a function of the material which is to be milled. For example, the vehicle driver can predefine a relatively high rotational speed for a relatively soft stone, and a relatively low rotational speed for a relatively hard stone, with the result that in the case of relatively hard stone the milling roller rotates more slowly than in the case of relatively soft stone.

If the milling cutters of the milling roller were to suddenly come up against particularly hard stone, problems occur in practice in construction machines with a conventional limit load control. It is assumed that the vehicle driver predefines a specific rotational speed for the internal combustion engine for a specific hardness of the stone, and therefore predefines a specific cutting speed for the milling cutters. If the milling cutters of the milling roller then suddenly come up against stone which is harder than the stone for which the vehicle driver has predefined a specific rotational speed, the advancing speed of the construction machine is correspondingly reduced in order to be able to keep the rotational speed of the internal combustion engine constant.

Figure 4:
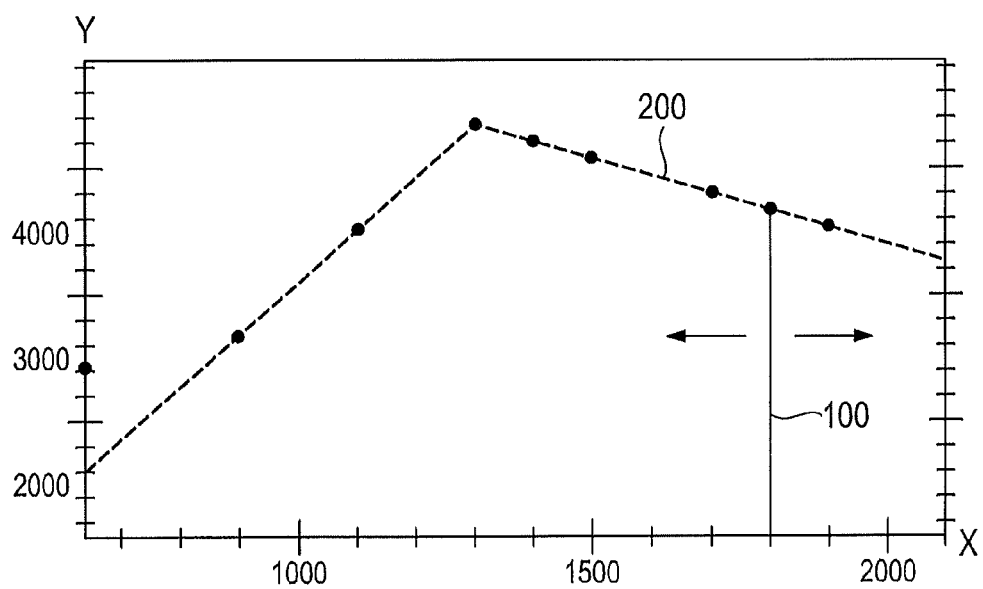
FIG. 4 shows the torque as a function of the rotational speed of the internal combustion engine.

FIG. 4 shows the dependence of the torque and rotational speed which is characteristic of an internal combustion engine. The rotational speed [1/min] is illustrated on the X axis, and the torque [Nm] is represented on the Y axis. In a conventional limit load control, the operating points of the internal combustion engine are predefined in the limit load range by the torque/rotational speed characteristic curve (roof-shaped curve). The limit load control is carried out in such a way that the operating points of the internal combustion engine lie in the limit load range on the roof-shaped curve 200. Although the vehicle driver can predefine different rotational speeds, by predefining a specific rotational speed the vehicle driver also predefines a specific torque which is obtained from the roof-shaped curve.

If the rotational speed of the internal combustion engine and therefore the cutting speed of the milling cutters is kept constant in the limit load range, the milling cutters cut at an excessively high cutting speed, with the result that there is the risk of the milling cutters being damaged.

In the conventional limit load control, for the vehicle driver there is basically the possibility of operating the internal combustion engine in the limit load range with a relatively low rotational speed, i.e. with a relatively low cutting speed of the milling cutters. If the vehicle driver sets a relatively low rotational speed for the internal combustion engine, the torque of the internal combustion engine increases owing to the relationship between the torque and rotational speed which is characteristic of the internal combustion engine. However, in practice given an excessively high torque the drive elements and the structure of the construction machine can be overloaded by shock loading. This is because for the torque to be increased it is necessary for the construction machine still to be able to apply with its own weight a sufficient bearing contact force which corresponds to the high torque.

In contrast to a conventional limit load control, the control device 16 according to the invention provides for the adjustable hydrostatic gear mechanism 10 to be controlled, i.e. for the advancing speed of the construction machine to be set, in such a way that the slip $\Delta=n_1-n_2$ assumes a predefined value. The vehicle driver can therefore predefine a specific value for the slip. In this context, the vehicle driver can also change the rotational speed of the internal combustion engine.

By predefining a specific slip and changing the rotational speed, the vehicle driver can operate the internal combustion engine of the construction machine at different operating points which are below the roof-shaped curve (FIG. 4). Conventional limit load control during which the operating points in the limit load range lie on the roof-shaped curve therefore does not take place. The reduction in the rotational speed is therefore not associated with an increase in the torque (FIG. 4).

In practice, the vehicle driver will select a relatively low rotational speed in the case of relatively hard stone and a relatively high rotational speed in the case of relatively soft stone. The vehicle driver can select an optimum operating point, which is below the roof-shaped curve, by predefining a specific slip, which the vehicle driver can set independently of the predefined rotational speed.

It is to be assumed that a rotational speed of 1800 [1/min] is predefined. The vehicle driver can then select, by setting a specific slip for the internal combustion engine, the operating points which lie on the line 100 shown in FIG. 4. The torque which occurs given the predefining rotational speed and the predefined slip is apparent here from FIG. 3.

If the vehicle driver sets a relatively high or relatively low rotational speed, he can operate the engine at operating points which lie to the left or right of the line 100 in FIG. 4. The relationship between the rotational speed, torque and slip is apparent here again from FIGS. 3 and 4. Consequently, the vehicle driver can set all the operating points which lie below the roof-shaped curve in a specific rotational speed range.

As an example of the control according to the invention it will be assumed that the milling cutters of the milling roller come up against relatively hard stone. The control according to the invention then controls the drive power in such a way that the slip $\Delta=n_1-n_2$ assumes a predefined value, i.e. remains constant. This leads to a reduction in the torque given the constant rotational speed (FIG. 3). Consequently, although the milling cutters are operated at the same cutting speed, they are operated with a relatively low torque.

What is claimed is:

1. A self-propelling construction machine, comprising:
a chassis including crawler track units;
a working unit including at least one milling drum configured to mill a ground surface as the construction machine is advanced by the crawler track units;
a drive unit including at least one internal combustion engine;
a first power transmission line for transmitting a first drive power from the drive unit to the or crawler track units, wherein the first power transmission line is configured such that the first drive power to be transmitted can be controlled;
a second power transmission line for transmitting a second drive power from the drive unit to the milling drum, the second transmission line including a gear mechanism system; and
a controller configured to control the second drive power;
wherein the gear mechanism system of the second power transmission line includes:
a hydrodynamic gear mechanism including a drive shaft and an output shaft; and
a sensor for measuring a difference between a rotational speed $n_1$ of the drive shaft and a rotational speed $n_2$ of the output shaft; and
wherein the controller is configured such that the first power which is transmitted via the first power transmission line is controlled so as to control an advance speed of the crawler track units and thereby control an advance seed at which the milling drum is advanced into the ground surface in such a way that the rotational speed difference $\Delta=n_1-n_2$ between the drive shaft and the output shaft of the hydrodynamic gear mechanism corresponds to a predefined value.

2. The self-propelling construction machine according to claim 1, wherein the first power transmission line includes a gear mechanism system including an adjustable hydrostatic gear mechanism, wherein the controller is configured to adjust the adjustable hydrostatic gear mechanism in such a way that the rotational speed difference $\Delta=n_1-n_2$ between the drive shaft and the output shaft of the hydrodynamic gear mechanism corresponds to the predefined value.

3. The self-propelling construction machine according to claim 1, wherein the first power transmission line includes at least one hydraulic pump with an adjustable delivery volume, which hydraulic pump is connected via hydraulic lines to at least one hydraulic motor for driving the crawler track units.

4. The self-propelling construction machine according to claim 1, further comprising:
an activation device for predefining a first operating state and a second operating state, the activation device being configured such that the controller is deactivated in the first operating state and activated in the second operating state.

5. The self-propelling construction machine according to claim 1, wherein the hydrodynamic gear mechanism is a turboclutch.

6. The self-propelling construction machine according to claim 1, wherein the gear mechanism system of the second power transmission line includes a traction drive including a drive element connected to the output shaft of the hydrodynamic gear mechanism and an output element connected to the milling drum.

7. A method for controlling a self-propelling construction machine, wherein the construction machine includes:
a chassis including crawler track units;

a working unit including at least one milling drum configured to mill a ground surface as the construction machine is advanced by the crawler track units;

a drive unit including at least one internal combustion engine;

a first power transmission line for transmitting a first drive power of the drive unit to the crawler track units, wherein the first power transmission line is configured such that the first drive power to be transmitted can be controlled;

a second power transmission line for transmitting a second drive power of the drive unit to the milling drum, the second power transmission line including a gear mechanism system including a hydrodynamic gear mechanism with a drive shaft and an output shaft ;

the method comprising:

controlling the first drive power to be transmitted by the first power transmission line so as to control an advance speed of the crawler track units and thereby advance speed at which the milling drum is advanced into the ground surface such that a rotational speed difference between the drive shaft and the output shaft of the hydrodynamic gear mechanism corresponds to a predefined value.

8. The method according to claim 7, wherein the first power transmission line includes a gear mechanism system including an adjustable hydrostatic gear mechanism, wherein:

the controlling step comprises adjusting the adjustable hydrostatic gear mechanism such that the rotational speed difference between the drive shaft and the output shaft of the hydrodynamic gear mechanism corresponds to the predefined value.

9. The method according to claim 7, further comprising selecting between a first operating state in which said controlling step is deactivated, and a second operating state in which said controlling step is activated.

10. A self-propelling construction machine, comprising:

a chassis including crawler track units;

a milling drum configured to mill a ground surface as the construction machine is advanced by the crawler track units;

at least one internal combustion engine;

a first power transmission line for transmitting power from the internal combustion engine to the crawler track units, the first power transmission line including an adjustment device configured to adjust the power transmitted to the crawler track units;

a second power transmission line for transmitting power from the internal combustion engine to the milling drum, the second power transmission line including a hydrodynamic gear mechanism including a drive shaft and an output shaft;

a sensor system configured to detect an input rotational speed of the drive shaft and an output rotational speed of the output shaft; and a controller configured to control the adjustment device to adjust the power transmitted to the crawler track units so as to control an advance speed of the crawler track units and thereby control an advance seed at which the milling drum is advanced into the ground surface such that a rotational speed difference between the input rotational speed and the output rotational speed corresponds to a predefined value.

11. The construction machine of claim 10, wherein the controller includes an input unit for selecting the predefined value.

12. The construction machine of claim 10, wherein the first power transmission line includes an adjustable hydrostatic gear mechanism.

13. The construction machine of claim 12, wherein the adjustable hydrostatic gear mechanism includes:

at least one hydraulic pump having an adjustable delivery volume; and at least one hydraulic motor for driving the crawler track units.

14. The construction machine of claim 10, further comprising:

an activation device operatively associated with the controller and configured to selectively deactivate the controller so that the power transmitted to the crawler track units is not adjusted.

15. The construction machine of claim 10, wherein:

the first power transmission line includes at least one hydraulic pump having an adjustable delivery volume, and at least one hydraulic motor for driving the crawler track units, the hydraulic motor being driven by fluid from the hydraulic pump; and the controller is configured to control the delivery volume of the hydraulic pump in response to the rotational speed difference between the input rotational speed and the output rotational speed of the hydrodynamic gear mechanism of the second power transmission line.

\* \* \* \* \*

UNITED STATES PATENT AND TRADEMARK OFFICE
CERTIFICATE OF CORRECTION

| | | |
|---|---|---|
| PATENT NO. | : 8,958,959 B2 | Page 1 of 1 |
| APPLICATION NO. | : 13/653105 | |
| DATED | : February 17, 2015 | |
| INVENTOR(S) | : von Schönebeck et al. | |

It is certified that error appears in the above-identified patent and that said Letters Patent is hereby corrected as shown below:

In the Claims

Column 8, line 31, Claim 1, replace "seed" with --speed--;
Column 9, line 18, Claim 7, after "thereby" insert --controlling an--;
Column 10, line 12, Claim 10, replace "seed" with --speed--.

Signed and Sealed this
Twenty-fifth Day of August, 2015

Michelle K. Lee
*Director of the United States Patent and Trademark Office*